United States Patent
Shimada et al.

(10) Patent No.: US 8,766,145 B2
(45) Date of Patent: Jul. 1, 2014

(54) PROCESS FOR PRODUCING SEMICONDUCTIVE PORCELAIN COMPOSITION AND HEATER EMPLOYING SEMICONDUCTIVE PORCELAIN COMPOSITION

(75) Inventors: Takeshi Shimada, Osaka (JP); Kentaro Ino, Osaka (JP); Toshiki Kida, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 443 days.

(21) Appl. No.: 12/920,366

(22) PCT Filed: Mar. 12, 2009

(86) PCT No.: PCT/JP2009/054809
§ 371 (c)(1),
(2), (4) Date: Aug. 31, 2010

(87) PCT Pub. No.: WO2009/116452
PCT Pub. Date: Sep. 24, 2009

(65) Prior Publication Data
US 2011/0011848 A1    Jan. 20, 2011

(30) Foreign Application Priority Data
Mar. 19, 2008 (JP) .................. P2008-071353

(51) Int. Cl.
*H05B 3/10* (2006.01)
*H05B 3/14* (2006.01)
*C04B 35/468* (2006.01)
*C04B 35/64* (2006.01)

(52) U.S. Cl.
USPC .......... 219/553; 252/62; 252/62.9 R; 423/263

(58) Field of Classification Search
CPC .................. H05B 3/141; H05B 2203/002
USPC ................... 219/553; 252/62; 423/263
See application file for complete search history.

(56) References Cited

U.S. PATENT DOCUMENTS

| 6,241,908 B1 * | 6/2001 | Hirose et al. ............. 252/62.9 R |
| 2002/0011919 A1 | 1/2002 | Ito et al. ............................ 338/23 |

(Continued)

FOREIGN PATENT DOCUMENTS

| CN | 2532654 | 1/2003 |
| CN | 1482628 | 3/2004 |

(Continued)

OTHER PUBLICATIONS

Machine Translation of JP 2006179692 A.*

(Continued)

*Primary Examiner* — Lynne Gurley
*Assistant Examiner* — Vernon P Webb
(74) *Attorney, Agent, or Firm* — Stein IP, LLC

(57) ABSTRACT

To improve jump characteristic of $BaTiO_3$—$(Bi_{1/2}Na_{1/2})TiO_3$ material.

There is provided a process for producing a semiconductive porcelain composition in which a part of Ba is substituted with Bi—Na, the process including a step of preparing a $(BaQ)TiO_3$ calcined powder (in which Q is a semiconductor dopant), a step of preparing a $(BiNa)TiO_3$ calcined powder, a step of mixing the $(BaQ)TiO_3$ calcined powder and the $(BiNa)TiO_3$ calcined powder, a step of molding and sintering the mixed calcined powder, and a step of heat-treating the obtained sintered body at 600° C. or lower; and a PCT heater employing the element prepared by the above steps.

8 Claims, 2 Drawing Sheets

(56) References Cited

U.S. PATENT DOCUMENTS

2002/0066882 A1* 6/2002 Nishida et al. ............ 252/62.9 R
2004/0033629 A1 2/2004 Mihara et al.
2009/0057626 A1* 3/2009 Shimada et al. ......... 252/520.21

FOREIGN PATENT DOCUMENTS

| | | |
|---|---|---|
| EP | 1 876 157 | 1/2008 |
| JP | 56-169301 | 12/1981 |
| JP | S61-086467 A | 5/1986 |
| JP | 08-153604 | 6/1996 |
| JP | 2001-130957 | 5/2001 |
| JP | 2006-179692 | 7/2006 |
| JP | 2006179692 A * | 7/2006 |
| JP | 2007-246328 | 9/2007 |
| TW | 487742 | 12/1990 |
| WO | WO 2006/106910 | 10/2006 |
| WO | WO 2006/118274 | 11/2006 |
| WO | WO 2007/023512 | 3/2007 |
| WO | WO 2007/097462 | 8/2007 |

OTHER PUBLICATIONS

Search Report issued in International Application No. PCT/JP2009/054809 on Jun. 16, 2009.

European Search Report for Application No. 09726092.1-1213/2256100 PCT/JP2009054810; Dec. 6, 2011, 9 pages.

The State Intellectual Property Office of the People's Republic of China—Notification of the First Office Action for Application No. 200980107173.0; Issued Sep. 28, 2012, Text of the First Office Action (English), Search Report (Chinese) for Application No. 2009801071730; Filed Mar. 19, 2009.

Ping-Hua Xiang, et al., *High Tc lead-free $BaTiO_3$—$(Bi_{frax;1;2}Na_{frax;1;2})TiO_3$ positive temperature coefficient of resistivity ceramics with electrically heterogeneous structure*, Applied Physics Letters vol. 91, Published online Oct. 17, 2007, pp. 162904-1 through162904-3.

Weirong Huo, et al., *Effects of $Bi_{frax;1;2}Na_{frax;1;2}TiO_3$ on the Curie temperature and the PTC effects of $BaTiO_3$-based positive temperature coefficient ceramics*, Sensors and Actuators A, vol. 128, Available online Feb. 20, 2006, pp. 265-269.

Japanese Office Action issued on Aug. 27, 2013, issued in corresponding Japanese Patent Application Serial No. 2008-071353.

Japanese Office Action issued on Jan. 21, 2014 by the Japanese Patent Office, in corresponding Japanese Application No. 2008-071353.

Taiwanese Office Action dated Dec. 3, 2013, issued in corresponding Taiwanese Patent Application, TW 497742.

* cited by examiner (a) NON-HEAT TREATMENT (b) HEAT-TREATED

PROCESS FOR PRODUCING SEMICONDUCTIVE PORCELAIN COMPOSITION AND HEATER EMPLOYING SEMICONDUCTIVE PORCELAIN COMPOSITION

CROSS-REFERENCE TO RELATED APPLICATIONS

This application claims the benefit of PCT International Patent Application No. PCT/JP2009/054809, filed Mar. 12, 2009, and Japanese Patent Application No. 2008-071353, filed Mar. 19, 2008, in the Japanese Patent Office, the disclosures of which are incorporated herein by reference.

BACKGROUND OF THE INVENTION

1. Field of the Invention

The present invention relates to a process for producing a semiconductive porcelain composition having a positive temperature coefficient of resistance (PTC), and a heater employing the semiconductive porcelain composition.

2. Description of the Related Art $BaTiO_3$ semiconductive porcelain composition has been known as a material showing a positive resistance temperature characteristic. When $SrTiO_3$ or $PbTiO_3$ is added to the $BaTiO_3$ semiconductive porcelain composition, a Curie temperature can be shifted, but only $PbTiO_3$ is an additive material that enables shifting in a positive direction. However, since $PbTiO_3$ contains an element causing environmental pollution, a material using no $PbTiO_3$ as an additive material has been desired. Consequently, a semiconductive porcelain composition in which a part of Ba in $BaTiO_3$ is substituted with Bi—Na was proposed (see Patent Document 1).

Where a $BaTiO_3$-based material is treated by, for example, sintering in a reducing atmosphere so as to decrease room temperature resistivity, there is a problem that a temperature coefficient of resistance (jump characteristic) is decreased. When the jump characteristic is decreased, there is a problem that switching does not occur at the objective temperature. Therefore, to improve the jump characteristic, it is proposed to conduct a heat treatment at high temperature exceeding 1,100° C. (Patent Document 2).

Patent Document 1: WO 2006/106910
Patent Document 2: JP-A-56-169301

SUMMARY OF THE INVENTION

In recent years, PTC material is frequently used in high temperature environment in view of improvement in heat resistance characteristic thereof. However, further improvement in jump characteristic has been desired to enable the material to be used in higher temperature environment. $BaTiO_3$—$(Bi_{1/2}Na_{1/2})TiO_3$-based material, which is free of Pb and in which a part of Ba is substituted with Bi—Na, has sufficient jump characteristic by itself, but it is necessary to improve the jump characteristic in view of the above-mentioned demand. Although the above-described heat treatment may be considered to improve the jump characteristic thereof, it could be confirmed that even though the heat treatment as applied to a $BaTiO_3$-based material containing Pb is merely applied as it is, the jump characteristic is not improved.

Aspects of the present invention has been made in view of the above circumstances, and has an object to improve a jump characteristic of a semiconductive porcelain composition in which a part of Ba of $BaTiO_3$ in $BaTiO_3$—$(Bi_{1/2}Na_{1/2})TiO_3$-based material and the like is substituted with Bi—Na.

As a result that the present inventors have conducted heat treatment to a $BaTiO_3$—$(Bi_{1/2}Na_{1/2})TiO_3$-based material, it was confirmed that PTC characteristics are impaired by high heat temperature treatment such that an element becomes an insulator at the treatment temperature of 1,280° C. The reason therefor is considered that trivalent Ti formed by valence control is oxidized into tetravalent Ti, whereby a carrier is reduced.

Furthermore, since the jump characteristic of a $BaTiO_3$-based material containing Pb depends on an oxygen amount of grain boundary, it is necessary to introduce oxygen into the grain boundary after reducing oxygen defect caused during sintering. Therefore, unless the heat treatment is conducted at 800° C. or higher that recovers oxygen defect, the practicable jump characteristic cannot be obtained. On the other hand, in the $BaTiO_3$—$(Bi_{1/2}Na_{1/2})TiO_3$-based material, not only oxygen amount of grain boundary but also component distribution of a material affect the jump characteristic. Therefore, it is possible to improve the jump characteristic only by introducing oxygen into the grain boundary without restoring oxygen defect. Consequently, it has been found that the jump characteristic can be improved even when heat treatment is conducted at 600° C. or lower.

Based on the above finding, aspects of the present invention are to improve a jump characteristic by heat-treating a semiconductive porcelain composition in which a part of Ba is replaced with Bi—Na at 600° C. or lower. The heat treatment may be conducted in the air, but is preferably conducted in an atmosphere containing oxygen. More quickly, heat treatment in an oxygen atmosphere is preferred.

Furthermore, aspects of the present invention are to improve a jump characteristic by forming an electrode to a semiconductive porcelain composition in which a part of Ba is substituted with Bi—Na, followed by heat-treating the same at 600° C. or lower in the air. In the case of forming an electrode, heat treatment in the air is preferred in order to avoid deterioration of the electrode.

The semiconductive porcelain composition produced by aspects of the present invention has a jump characteristic that is not appeared in the conventional semiconductive porcelain composition in which a part of Ba of $BaTiO_3$ is substituted with Bi—Na. Therefore, a heater employing a heating element comprising the semiconductive porcelain composition produced by aspects of the present invention is suitable for use in higher temperature environment.

According to aspects of the present invention, a jump characteristic of a semiconductive porcelain composition in which a part of Ba is substituted with Bi—Na can be improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

Figure 1:
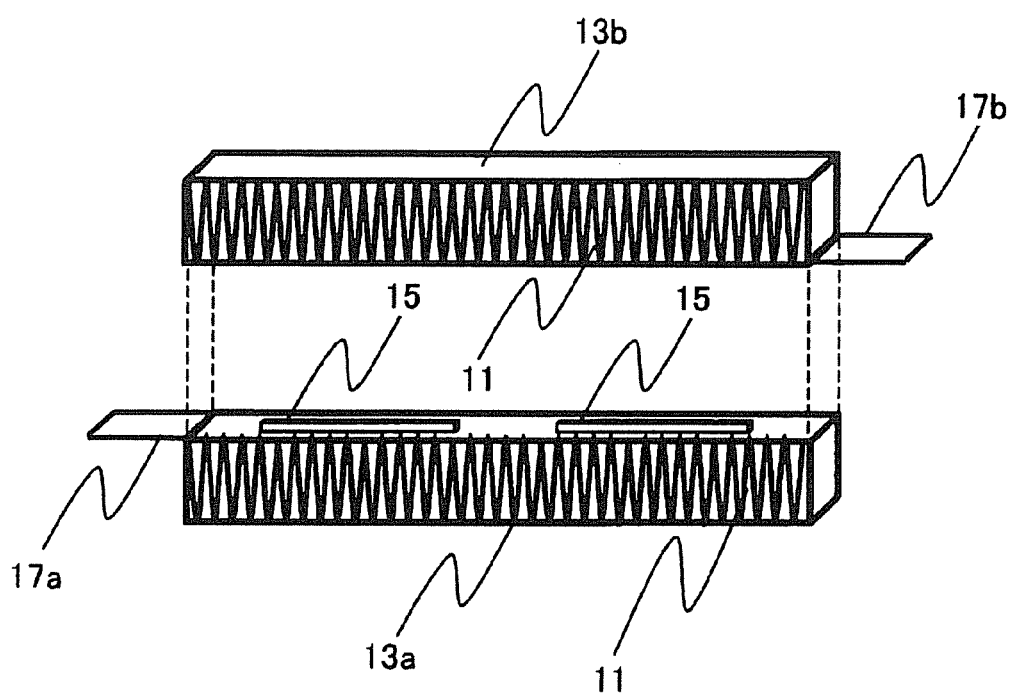
FIG. 1 is a schematic view showing the constitution of a heater element.

| DESCRIPTION OF REFERENCE NUMERALS AND SIGNS | |
|---|---|
| 11 | Radiation fin |
| 13a, 13b | Casing |
| 15 | Heater element |
| 17a, 17b | Feed element |

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention include heat-treating a $BaTiO_3$—$(Bi_{1/2}Na_{1/2})TiO_3$-based material in which a part of Ba is substituted with Bi—Na at 600° C. or lower. In the case of exceeding 600° C., the $BaTiO_3$—$(Bi_{1/2}Na_{1/2})TiO_3$-based material gradually exhibits insulating characteristic and converts to an insulating material at 1,280° C. Accordingly, 600° C. that is a range having practically no problem is employed as the upper limit of the heat treatment temperature. Regarding heat treatment time, since a jump characteristic is saturated when the heat treatment time is too long, the heat treatment time is preferably about 12 hours. Incidentally, the effect can be obtained even in the vicinity of room temperature if the heat treatment is conducted for a long period of time. The heat treatment in nitrogen decreases a jump characteristic and is therefore not preferred.

According to aspects of the present invention, the step of preparing a $(BaQ)TiO_3$ calcined powder (Q is a semiconductor dopant) is such that $BaCO_3$, $TiO_2$ and a raw material powder of semiconductor dopant, such as $La_2O_3$ or $Nb_2O_5$, are firstly mixed to prepare a raw material powder, and it is then calcined. Calcination temperature is preferably a range of from 600° C. to 1,000° C., and calcination time is preferably 0.5 hour or more. When the calcination temperature is lower than 600° C. or the calcination time is shorter than 0.5 hour, $(BaQ)TiO_3$ is hardly formed, and unreacted $BaCO_3$, BaO and $TiO_2$ disturbs a uniform reaction with $(BiNa)TiO_3$, and prevents development of PTC characteristics, which is not preferred. When the calcination temperature exceeds 1,000° C., the effect of controlling Bi volatilization is lost, and stable formation of $(BaQ)TiO_3$—$(BiNa)TiO_3$ is prevented, which is not preferred.

According to aspects of the present invention, the step of preparing a $(BiNa)TiO_3$ calcined powder is such that $Na_2CO_3$, $Bi_2O_3$ and $TiO_2$ as raw material powders are firstly dry mixed to prepare a mixed raw material powder, and it is then calcined. Calcination temperature is preferably a range of from 700° C. to 950° C., and calcination time is preferably from 0.5 hour to 10 hours. When the calcination temperature is lower than 700° C. or the calcination time is shorter than 0.5 hour, unreacted NaO reacts with ambient moisture or a solvent in the case of wet mixing, causing compositional deviation and variation of characteristics, which is not preferred. When the calcination temperature exceeds 950° C. or the calcination time exceeds 10 hours, Bi volatilization proceeds to cause compositional deviation, thereby formation of a secondary phase is accelerated, which is not preferred.

According to aspects of the present invention, the step of mixing the $(BaQ)TiO_3$ calcined powder and the $(BiNa)TiO_3$ calcined powder is such that these calcined powders are blended in given amounts, followed by mixing. Mixing may be either of wet drying using pure water or ethanol and dry mixing, and the dry mixing is preferably conducted because compositional deviation can further be prevented. Depending on a particle size of a calcined powder, pulverization may be conducted after mixing, or mixing and pulverization may simultaneously be conducted. An average grain size of the mixed calcined powder after mixing and pulverization is preferably from 0.6 μm to 1.5 μm.

In the above step, when Si oxide is added in an amount of 3.0 mol % or less, or Ca carbonate or Ca oxide is added in an amount of 4.0 mol % or less, the Si oxide can suppress abnormal growth of crystal grains and additionally facilitates to control resistivity, and the Ca carbonate or the Ca oxide can improve sinterability at low temperature, which are preferred. Where either one of them is added in an amount exceeding the above limited amount, a composition does not show semiconductive property, which is not preferred. The addition is preferably conducted before mixing in each step.

According to aspects of the present invention, the step of molding and sintering a calcined powder obtained by mixing the $(BaQ)TiO_3$ calcined powder and the $(BiNa)TiO_3$ calcined powder is such that the mixed calcined powder is firstly molded by the desired molding means. As necessary, the pulverized powder may be granulated by a granulating apparatus before molding. Density of a molded article after molding is preferably from 2 to 3 $g/cm^3$. The sintering can be conducted in the air, a reducing atmosphere or an inert gas atmosphere of low oxygen concentration at a sintering temperature of from 1,200° C. to 1,400° C. for a sintering time of from 2 hours to 6 hours. In the case that granulation is conducted before mixing, a binder-removal treatment is preferably conducted at from 300° C. to 700° C. before sintering.

According to aspects of the present invention, the step of forming an electrode to a semiconductive porcelain composition is such that a sintered body is processed into a plate shape to prepare a test piece, and an ohmic electrode is then formed on the surface thereof. Ti, Cr, Ni, Al, Fe, Cu, Ag—Zn and the like can be selected as the ohmic electrode. The ohmic electrode may be formed by baking onto the test piece, or by sputtering or vapor deposition. The ohmic electrode is preferably covered with a covering electrode, for example, Ag, Al, Au or Pt, to protect the ohmic electrode.

Example 1

Raw material powders of $BaCO_3$ and $TiO_2$ as main materials and $La_2O_3$ as a semiconductor dopant were prepared, and were blended so as to be $(Ba_{0.994}La_{0.006})TiO_3$, and as necessary, $CaCO_3$ and $SiO_2$ were further added as sintering aids, and were mixed in ethanol. The mixed raw material powder obtained was calcined at 900° C. for 4 hours in the air to prepare a $(BaLa)TiO_3$ calcined powder.

Raw material powders of $Na_2CO_3$, $Bi_2O_3$ and $TiO_2$ were prepared, and were blended so as to be $(Bi_{0.5}Na_{0.5})TiO_3$. As necessary, a sintering aid was further added, followed by mixing in the air or ethanol. The mixed raw material powder obtained was calcined at 800° C. for 4 hours in the air to prepare a $(BiNa)TiO_3$ calcined powder.

The $(BaLa)TiO_3$ calcined powder and the $(BiNa)TiO_3$ calcined powder were blended so as to be $[(Bi_{0.5}Na_{0.5})_{0.1}(Ba_{0.994}La_{0.006})_{0.9}]TiO_3$, and were mixed and pulverized by a pot mill using pure water as a medium until a mixed calcined powder became 1.0 μm to 2.0 μm, followed by drying. PVA was added to a pulverized powder of the mixed calcined powder, and the resulting mixture was mixed and then granulated by a granulating apparatus. The granulated powder obtained was molded with a single-screw press apparatus, and a molded article obtained was subjected to binder removal at 700° C., and then sintered in nitrogen at a sintering temperature of 1,340° C. for 4 hours, thereby obtaining a sintered body. Incidentally, when the (BaLa)TiO$_3$ calcination temperature is 900° C. or lower, BaCO$_3$ and TiO$_2$ can remain in a calcined powder, or when BaCO$_3$ and TiO$_2$ are post-added to a calcined powder in which the (BaLa)TiO$_3$ calcination temperature is 1,000° C. or higher and 1,200° C. or lower, the characteristics can be stabilized.

The sintered body obtained was processed into a plate shape of 10 mm×10 mm×1 mm to prepare a test piece, and an ohmic electrode constituted of Ag—Zn and a covering electrode comprising Ag as a main component to be formed thereon were simultaneously baked onto the test piece to prepare a test element. Temperature change of resistivity of the test piece was thereafter measured in a range of from room temperature to 270° C. with a resistance measuring instrument, and room temperature resistivity, Curie temperature and temperature coefficient of resistance $(\ln R_1 - \ln R_c) \times 100/(T_1 - T_c)$ in which $R_1$: maximum resistivity, $R_c$: resistivity at $T_c$, $T_1$: temperature showing $R_1$, and $T_c$: Curie temperature, were measured as PTC characteristics. After the measurement, the electrode was removed, and heat treatment was conducted at from room temperature to 800° C. After the heat treatment, an electrode was again formed on the material, and the above PTC characteristics were evaluated.

Table 1 shows PTC characteristics when heat treatment was conducted at from 20° C. to 600° C. in an oxygen atmosphere, and Table 2 shows PTC characteristics when heat treatment was conducted at from 20° C. to 800° C. in the air. Focusing on the temperature coefficient of resistance, it could be confirmed that the samples in which the heat treatment was conducted in an oxygen atmosphere and in the air all show a value higher than that of the temperature coefficient of resistance of the samples before heat treatment.

TABLE 1

| No. | Temperature (° C.) | Time (hr) | Heat treatment in oxygen atmosphere | | | Before heat treatment (Comparative Example) | | |
|---|---|---|---|---|---|---|---|---|
| | | | Temperature coefficient of resistance (%/K) | Room temperature resistivity (Ωcm) | Curie temperature (° C.) | Temperature coefficient of resistance (%/K) | Room temperature resistivity (Ωcm) | Curie temperature (° C.) |
| O1 | 20 | 12 | 8.9 | 56.9 | 163.3 | 8.8 | 49.1 | 163.3 |
| O2 | | 24 | 9.1 | 56.4 | 163.7 | 9.2 | 50.2 | 163.2 |
| O3 | | 48 | 9.4 | 58.6 | 162.8 | 9.0 | 49.0 | 163.1 |
| O4 | | 72 | 9.5 | 60.9 | 163.4 | 9.1 | 50.9 | 163.3 |
| O5 | 200 | 1 | 9.2 | 53.5 | 163.4 | 8.2 | 58.1 | 155.6 |
| O6 | | 3 | 8.9 | 54.9 | 163.3 | 8.6 | 58.8 | 164.4 |
| O7 | | 6 | 9.4 | 55.6 | 163.6 | 9.0 | 60.0 | 163.4 |
| O8 | | 9 | 9.3 | 64.3 | 162.0 | 9.0 | 57.6 | 163.8 |
| O9 | 300 | 1 | 10.0 | 63.1 | 166.4 | 9.1 | 59.7 | 160.8 |
| O10 | | 3 | 10.6 | 75.2 | 166.5 | 9.4 | 68.0 | 165.7 |
| O11 | | 6 | 10.9 | 87.4 | 164.1 | 9.3 | 68.9 | 165.7 |
| O12 | | 9 | 10.7 | 78.9 | 164.2 | 8.4 | 67.5 | 165.9 |
| O13 | 400 | 1 | 9.1 | 71.7 | 161.3 | 9.1 | 59.7 | 160.8 |
| O14 | | 3 | 9.4 | 57.1 | 161.6 | 9.4 | 68.0 | 165.7 |
| O15 | | 6 | 12.2 | 108.1 | 164.4 | 9.3 | 68.9 | 165.7 |
| O16 | | 9 | 11.9 | 96.7 | 162.2 | 8.4 | 67.5 | 165.9 |
| O17 | 600 | 3 | 12.2 | 106.6 | 161.4 | 9.1 | 59.7 | 160.8 |
| O18 | | 6 | 12.6 | 124.4 | 163.9 | 9.4 | 68.0 | 165.7 |
| O19 | | 9 | 12.4 | 120.4 | 164.2 | 9.3 | 68.9 | 165.7 |
| O20 | | 12 | 11.4 | 94.1 | 164.2 | 8.4 | 67.5 | 165.9 |

TABLE 2

| No. | Temperature (° C.) | Time (hr) | Heat treatment in the air | | | Before heat treatment (Comparative Example) | | |
|---|---|---|---|---|---|---|---|---|
| | | | Temperature coefficient of resistance (%/K) | Room temperature resistivity (Ωcm) | Curie temperature (° C.) | Temperature coefficient of resistance (%/K) | Room temperature resistivity (Ωcm) | Curie temperature (° C.) |
| A1 | 20 | 24 | 9.0 | 54.3 | 163.5 | 8.9 | 49.0 | 163.3 |
| A2 | | 120 | 9.1 | 56.4 | 163.8 | 9.2 | 50.2 | 163.2 |
| A3 | | 240 | 9.4 | 58.7 | 162.8 | 9.0 | 49.0 | 163.3 |
| A4 | | 480 | 9.7 | 61.1 | 163.5 | 9.0 | 51.0 | 163.4 |
| A5 | 200 | 1 | 8.9 | 55.9 | 163.8 | 7.8 | 45.2 | 166.9 |
| A6 | | 3 | 9.1 | 58.1 | 163.2 | 7.8 | 45.7 | 166.2 |
| A7 | | 6 | 9.4 | 58.9 | 163.2 | 7.9 | 49.0 | 165.8 |
| A8 | | 9 | 9.0 | 61.2 | 163.7 | 8.1 | 43.8 | 166.2 |
| A9 | 300 | 1 | 9.0 | 68.3 | 163.4 | 7.9 | 43.5 | 166.1 |
| A10 | | 3 | 9.0 | 65.7 | 163.5 | 7.6 | 45.3 | 166.6 |
| A11 | | 6 | 9.0 | 54.5 | 164.2 | 7.8 | 41.9 | 167.3 |
| A12 | | 9 | 9.1 | 54.1 | 163.8 | 7.7 | 41.5 | 167.1 |
| A13 | 400 | 1 | 9.2 | 56.2 | 163.7 | 8.0 | 43.3 | 166.8 |

TABLE 2-continued

| | | | Heat treatment in the air | | | Before heat treatment (Comparative Example) | | |
|---|---|---|---|---|---|---|---|---|
| No. | Temperature (° C.) | Time (hr) | Temperature coefficient of resistance (%/K) | Room temperature resistivity (Ωcm) | Curie temperature (° C.) | Temperature coefficient of resistance (%/K) | Room temperature resistivity (Ωcm) | Curie temperature (° C.) |
| A14 | | 3 | 9.1 | 58.2 | 163.9 | 8.1 | 41.9 | 166.9 |
| A15 | | 6 | 9.2 | 60.6 | 163.5 | 8.2 | 44.3 | 166.4 |
| A16 | | 9 | 9.3 | 63.2 | 163.2 | 7.4 | 41.3 | 167.7 |
| A17 | 600 | 3 | 9.6 | 101.1 | 162.6 | 8.5 | 82.4 | 165.4 |
| A18 | | 6 | 9.9 | 107.2 | 161.7 | 8.7 | 84.3 | 165.2 |
| A19 | | 9 | 9.0 | 96.7 | 163.8 | 8.5 | 88.0 | 165.7 |
| A20 | | 12 | 9.1 | 99.5 | 163.7 | 8.4 | 88.0 | 165.9 |
| A21 | 800 | 3 | 3.6 | 27800.7 | 200.2 | 8.6 | 90.5 | 165.9 |
| A22 | | 6 | 2.8 | 25787.4 | 224.1 | 8.4 | 89.7 | 165.9 |
| A23 | | 9 | −0.1 | 253807.6 | 245.2 | 8.8 | 115.4 | 163.7 |
| A24 | | 12 | 0.0 | 127963.6 | 245.3 | 8.9 | 110.5 | 165.2 |

Example 2

PTC characteristics were measured in the same manner as in Example 1. After the measurement, heat treatment was conducted at from room temperature to 800° C. in such a condition as it was without removing the electrode. Since the electrode deteriorates when the heat treatment is conducted in an oxygen atmosphere in a state of forming an electrode and since no effect can be obtained when the treatment is conducted in nitrogen, the heat treatment was conducted in the air. After the heat treatment, the PTC characteristics were evaluated.

TABLE 3

| | | | Heat treatment in the air after electrode formation | | | Before heat treatment (Comparative Example) | | |
|---|---|---|---|---|---|---|---|---|
| No. | Temperature (° C.) | Time (hr) | Temperature coefficient of resistance (%/K) | Room temperature resistivity (Ωcm) | Curie temperature (° C.) | Temperature coefficient of resistance (%/K) | Room temperature resistivity (Ωcm) | Curie temperature (° C.) |
| A1 | 20 | 24 | 9.0 | 54.3 | 163.5 | 8.9 | 49.0 | 163.3 |
| A2 | | 120 | 9.1 | 56.4 | 163.8 | 9.2 | 50.2 | 163.2 |
| A3 | | 240 | 9.4 | 58.7 | 162.8 | 9.0 | 49.0 | 163.3 |
| A4 | | 480 | 9.7 | 61.1 | 163.5 | 9.0 | 51.0 | 163.4 |
| A5 | 200 | 1 | 8.9 | 55.9 | 163.8 | 7.8 | 45.2 | 166.9 |
| A6 | | 3 | 9.1 | 58.1 | 163.2 | 7.8 | 45.7 | 166.2 |
| A7 | | 6 | 9.4 | 58.9 | 163.2 | 7.9 | 49.0 | 165.8 |
| A8 | | 9 | 9.0 | 61.2 | 163.7 | 8.1 | 43.8 | 166.2 |
| A9 | 300 | 1 | 9.0 | 68.3 | 163.4 | 7.9 | 43.5 | 166.1 |
| A10 | | 3 | 9.0 | 65.7 | 163.5 | 7.6 | 45.3 | 166.6 |
| A11 | | 6 | 9.0 | 54.5 | 164.2 | 7.8 | 41.9 | 167.3 |
| A12 | | 9 | 9.1 | 54.1 | 163.8 | 7.7 | 41.5 | 167.1 |
| A13 | 400 | 1 | 9.2 | 56.2 | 163.7 | 8.0 | 43.3 | 166.8 |
| A14 | | 3 | 9.1 | 58.2 | 163.9 | 8.1 | 41.9 | 166.9 |
| A15 | | 6 | 9.2 | 60.6 | 163.5 | 8.2 | 44.3 | 166.4 |
| A16 | | 9 | 9.3 | 63.2 | 163.2 | 7.4 | 41.3 | 167.7 |
| A17 | 600 | 3 | 9.6 | 101.1 | 162.6 | 8.5 | 82.4 | 165.4 |
| A18 | | 6 | 9.9 | 107.2 | 161.7 | 8.7 | 84.3 | 165.2 |
| A19 | | 9 | 9.0 | 96.7 | 163.8 | 8.5 | 88.0 | 165.7 |
| A20 | | 12 | 9.1 | 99.5 | 163.7 | 8.4 | 88.0 | 165.9 |
| A21 | 800 | 3 | 3.6 | 27800.7 | 200.2 | 8.6 | 90.5 | 165.9 |
| A22 | | 6 | 2.8 | 25787.4 | 224.1 | 8.4 | 89.7 | 165.9 |
| A23 | | 9 | −0.1 | 253807.6 | 245.2 | 8.8 | 115.4 | 163.7 |
| A24 | | 12 | 0.0 | 127963.6 | 245.3 | 8.8 | 110.5 | 165.2 |

Table 3 shows PTC characteristics when heat treatment was conducted from 20° C. to 800° C. in the atmosphere. Focusing on the temperature coefficient of resistance, it could be confirmed that the samples in which the heat treatment was conducted in the air all show a value higher than that of the temperature coefficient of resistance before the heat treatment, up to 600° C. However, it was confirmed that the value lower than that of the temperature coefficient of resistance before the heat treatment is shown at 800° C.

Example 3

An electrode was formed on the edge face of each of a material heat-treated at 400° C. and a material which was not heat-treated, to prepare a heater element. FIG. 1 shows the constitution of a heater element, and the heater element is constituted by sandwiching a heater element 15 between a pair of casing 13 (13a, 13b) equipped with a radiation fin 11. Voltage was applied to the heater element 15 through a feed terminal 17a provided in one casing 13a and a feed terminal 17b provided in the other casing 13b, thereby inducing heat generation of the heater element 15. After arranging the prepared heater element in a thermostat bath and increasing temperature to a given temperature, voltage of 13V was applied to the feed element, changes in voltage and current with respect to temperature were observed (see Table 4).

TABLE 4

| | Heat treatment | | | |
|---|---|---|---|---|
| | None | | 400° C. × 3 hrs | |
| Temperature (° C.) | Voltage (V) | Current (mA) | Voltage (V) | Current (mA) |
| 230 | 12.969 | 0.07413 | 12.978 | 0.01544375 |
| 240 | 12.972 | 0.04078 | 12.979 | 0.008322449 |
| 250 | 12.974 | 0.02263 | 12.98 | 0.004516966 |
| 260 | 12.975 | 0.0119 | 12.981 | 0.002333333 |
| 270 | 12.976 | 0.00627 | 12.98 | 0.001198853 |
| 280 | 12.976 | 0.00432 | 12.98 | 0.00081203 |
| 290 | 12.976 | 0.00332 | 12.98 | 0.000638462 |
| 300 | 12.976 | 0.00281 | 12.98 | 0.000542471 |
| 310 | 12.976 | 0.00241 | 12.98 | 0.000472549 |

Figure 2:
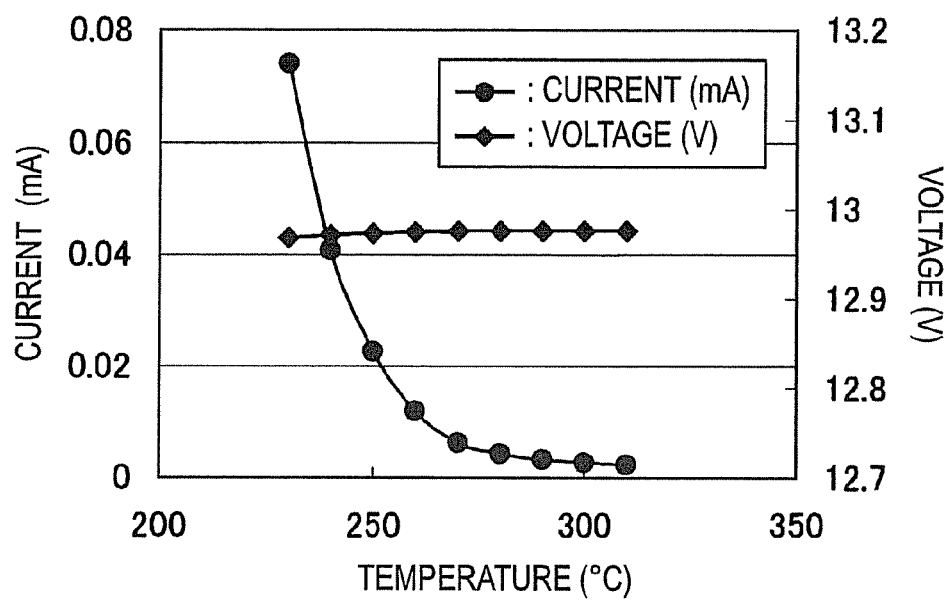
FIG. 2 includes graphs showing change in voltage and current with respect to temperature of a heater element.
Figure 2:
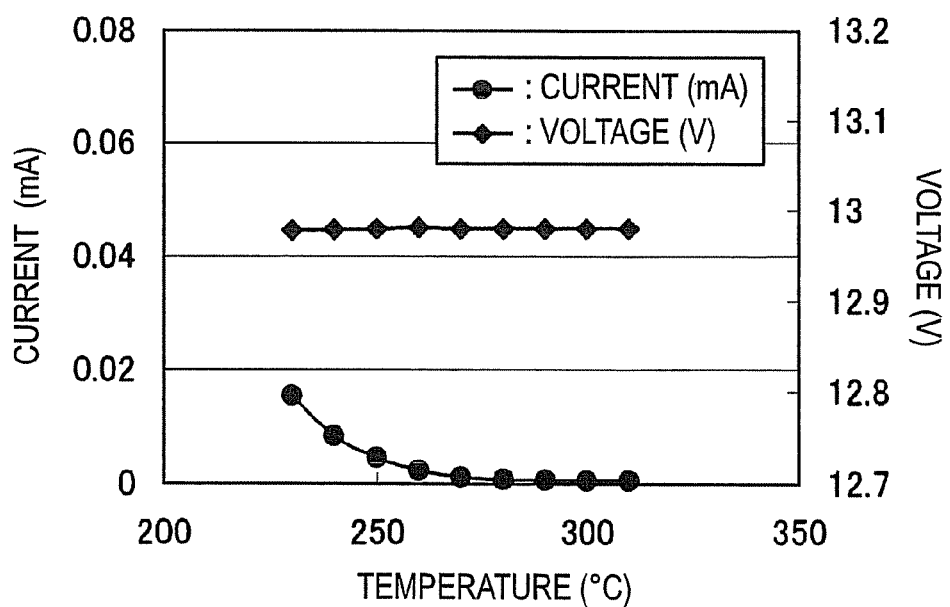

FIG. 2 includes views showing change in voltage and current (vertical axes) with respect to temperature (horizontal axis). It is seen that, as compared with non-heat treatment ((a) in the Figure), characteristics after heat treatment ((b) in the Figure) are such that a current value is extremely low at high temperature side and safety at high temperature is improved.

Although aspects of the present invention have been described in detail and by reference to the specific embodiments, it is apparent to one skilled in the art that various modifications or changes can be made without departing the spirit and scope of the present invention.

As described above, the semiconductive porcelain composition according to aspects of the present invention has jump characteristic which is not appeared in the conventional semiconductive porcelain composition in which a part Ba of $BaTiO_3$ is substituted with Bi—Na. A heater employing a heating element comprising the semiconductive porcelain composition is suitable for use in higher temperature environment.

The invention claimed is:

1. A process for producing a semiconductive porcelain composition provided with an electrode in which the semiconductive porcelain composition is a $BaTiO_3$-based semiconductive porcelain composition free of Pb, in which a part of Ba of $BaTiO_3$ is substituted with Bi—Na, and having a positive temperature coefficient of resistance, the process comprising:

a step of preparing a $(BaQ)TiO_3$ calcined powder (wherein Q is a semiconductor dopant);

a step of preparing a $(BiNa)TiO_3$ calcined powder;

a step of mixing the $(BaQ)TiO_3$ calcined powder and the $(BiNa)TiO_3$ calcined powder;

a step of molding and sintering the mixed calcined powder;

a step of heat-treating said obtained sintered body at 600° C. or lower for 1 hour or more in an atmosphere containing oxygen or in the air; and a step of forming the electrode to said obtained sintered body.

2. The process for producing a semiconductive porcelain composition according to claim 1, wherein the step of forming the electrode to said obtained sintered body is conducted, and then the step of heat-treating said obtained sintered body is conducted.

3. The process for producing a semiconductive porcelain composition according to claim 1, wherein sintering is conducted in the air, a reducing atmosphere or an inert gas atmosphere of low oxygen concentration at a sintering temperature of from 1,200° C. to 1,400° C.

4. The process for producing a semiconductive porcelain composition according to claim 2, wherein sintering is conducted in the air, a reducing atmosphere or an inert gas atmosphere of low oxygen concentration at a sintering temperature of from 1,200° C. to 1,400° C.

5. A heater comprising a heating element comprising a semiconductive porcelain composition provided with an electrode, which is obtained by forming the electrode to the semiconductive porcelain composition obtained by the production process according to claim 1.

6. A heater comprising a heating element comprising a semiconductive porcelain composition provided with an electrode, which is obtained by forming the electrode to the semiconductive porcelain composition obtained by the production process according to claim 2.

7. A heater comprising a heating element comprising a semiconductive porcelain composition provided with an electrode, which is obtained by forming the electrode to the semiconductive porcelain composition obtained by the production process according to claim 3.

8. A heater comprising a heating element comprising a semiconductive porcelain composition provided with an electrode, which is obtained by forming the electrode to the semiconductive porcelain composition obtained by the production process according to claim 4.

* * * * *